United States Patent
Haraguchi

(10) Patent No.: US 8,348,609 B2
(45) Date of Patent: Jan. 8, 2013

(54) METHOD FOR DE-ICING A BLADE OF A WIND TURBINE, A WIND TURBINE AND USE THEREOF

(75) Inventor: Yoshiki Haraguchi, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/754,349

(22) Filed: Apr. 5, 2010

(65) Prior Publication Data

US 2010/0189560 A1 Jul. 29, 2010

Related U.S. Application Data

(63) Continuation of application No. PCT/DK2008/000343, filed on Oct. 3, 2008.

(30) Foreign Application Priority Data

Oct. 5, 2007 (DK) .................................. 2007 01444

(51) Int. Cl.
 *F03D 7/04* (2006.01)
(52) U.S. Cl. .............................................. 416/1; 416/39
(58) Field of Classification Search ........................ None
 See application file for complete search history.

(56) References Cited

U.S. PATENT DOCUMENTS

| | | | |
|---|---|---|---|
| 6,270,308 B1 * | 8/2001 | Groppel | 415/4.3 |
| 6,467,233 B1 * | 10/2002 | Maliszewski et al. | 290/55 |
| 6,890,152 B1 * | 5/2005 | Thisted | 416/1 |
| 7,086,834 B2 | 8/2006 | LeMieux | |
| 2005/0008495 A1 * | 1/2005 | Wobben | 416/241 R |
| 2005/0276696 A1 | 12/2005 | Lemieux | |
| 2006/0018752 A1 | 1/2006 | Lemieux | |
| 2006/0140761 A1 * | 6/2006 | LeMieux | 416/61 |
| 2012/0134804 A1 * | 5/2012 | Magnuson | 416/39 |

FOREIGN PATENT DOCUMENTS

| | | |
|---|---|---|
| DE | 102004042423 A1 | 3/2006 |
| EP | 1748185 A1 | 1/2007 |
| JP | 2004-084527 A * | 3/2004 |
| JP | 2004084527 A | 3/2004 |
| WO | 2004057182 A1 | 7/2004 |
| WO | 2006066591 A1 | 6/2006 |

(Continued)

OTHER PUBLICATIONS

JP 2004-084527 A Machine Translation. Accessed JPO website May 2, 2011.*

(Continued)

*Primary Examiner* — Richard Edgar
(74) *Attorney, Agent, or Firm* — Wood, Herron & Evans, LLP

(57) ABSTRACT

A method for de-icing a blade of a wind turbine after the wind turbine has been idle for a period of time. The method includes the steps of creating a controlled acceleration condition of the blade, and subsequently creating a controlled deceleration condition of the blade, whereby ice is shaken off the blade. A wind turbine including a rotor including at least one blade, and deicing means for de-icing the blade wherein the de-icing means includes actuating means of the wind turbine and wherein the de-icing means further includes control means for performing a method for de-icing a blade. Furthermore, the invention relates to use of a wind turbine.

20 Claims, 5 Drawing Sheets

FOREIGN PATENT DOCUMENTS

WO         2007012195 A1      2/2007

OTHER PUBLICATIONS

JP 2004-84527 A Machine Translation. Claims. Accessed JPO website Mar. 8, 2012. pp. 2.*

DK Search Report; PA 2007 01444; May 15, 2008; 1 page.

International Preliminary Report on Patentability; PCT/DK2008/000343; Feb. 8, 2010; 9 pages.

International Search Report and Written Opinion of the International Searching Authority; PCT/DK2008/000343; Sep. 8, 2009; 14 pages.

Lacroix, et al.; "Wind Energy: Cold Weather Issues"; Jun. 2000; 17 pages.

* cited by examiner

METHOD FOR DE-ICING A BLADE OF A WIND TURBINE, A WIND TURBINE AND USE THEREOF

CROSS-REFERENCE TO RELATED APPLICATIONS

The present application is a continuation of pending International patent application PCT/DK2008/000343 filed on Oct. 3, 2008 which designates the United States and claims priority from Danish patent application PA 2007 01444 filed on Oct. 5, 2007, the content of which is incorporated herein by reference.

FIELD OF THE INVENTION

The invention relates to a method for de-icing a blade of a wind turbine, after the wind turbine has been idle for a period of time, the wind turbine further comprises an azimuth angle detector for detecting an actual azimuth position of the blade and use thereof.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated in FIG. 1.

As large modern wind turbines get bigger and bigger in power output and in cost the issue of downtime becomes more and more significant and modern wind turbines are constantly improved to ensure that they are able to produce power efficiently whenever usable wind conditions are present.

However, in this respect icing of the wind turbine blades can be a big problem in that it can prevent the wind turbine from producing power even though ideal wind conditions are present and from U.S. Pat. No. 6,890,152 it is therefore known to provide the blades of a wind turbine with a number of sonic horns, which will make the blade vibrate when activated and thereby make the ice break off. But disadvantages of such a system are many—including noise problems, cost, difficult to implement in the blades, etc.

An object of the invention is therefore to provide for an advantageous technique for de-icing wind turbine blades.

SUMMARY OF THE INVENTION

The invention provides for a method for de-icing a blade of a wind turbine, after the wind turbine has been idle for a period of time. The method comprises the steps of
  creating a controlled acceleration condition of the blade, and
  subsequently creating a controlled deceleration condition of the blade, whereby ice is shaken off the blade.

Creating an acceleration condition and subsequently a deceleration condition in the blade is advantageous in that this is a simple and efficient way of de-icing a wind turbine blade by hurling or shaking the ice or snow off the blade.

It is important that the acceleration condition and the deceleration condition are controlled in that, if the acceleration becomes too big it might damage the blade or the means creating the acceleration and if it is too small, the method will not be so efficient in de-icing the blade.

It should be emphasized that by the term "de-icing" is to be understood that a main part of the ice, snow or other is removed from the blade i.e. there may still be some minor ice portions left on the blade after the de-icing procedure have been completed.

It should also be emphasized that by the terms "acceleration condition" and "deceleration condition" are to be understood that the speed of a movement of the blade is increased and subsequently decreased i.e. the blade is moved and stopped, moved back and forth, moved in steps or any combination thereof in given directions to create a situation where the inertia of the ice or snow will make it rip off the blade surface when the direction of the movement is suddenly changed or the speed of the movement is suddenly decelerated or because the acceleration condition and the subsequent deceleration condition makes the blade flex to a degree that the ice cracks off the surface.

It should also be emphasized that even though the claim states that the acceleration condition subsequently is followed by the deceleration condition this does not exclude that the acceleration condition and the deceleration condition is separated by a period where the speed of the movement of the blade is substantially constant e.g. if rotation of the rotor was started—after having been idle for a period of time—by accelerating the rotor speed to a certain RPM (rotations per minute) and then when a specific blade reaches a specific azimuth position, the rotor rotation was abruptly but controllably stopped or decreased thereby creating a controlled deceleration condition of the blade and thereby shaking the ice of the blade.

In an aspect of the invention the method further comprises the step of positioning the blade in a predefined azimuth angle before the controlled acceleration condition is created.

By positioning the blade in a predefined azimuth position before the controlled acceleration condition is created it is possible to substantially control where the ice and snow—that has been shaken off—lands.

Furthermore, it is possible to run the de-icing procedure while the blade is in a position that stresses the blade or the rest of the wind turbine the least.

In an aspect of the invention the method further comprises the step of positioning the blade in a substantially downwards pointing direction before the controlled acceleration condition is created.

By making the blade point down before the controlled acceleration condition is created it is ensured that the straining effect of the gravity pull is reduced during the de-icing process hereby enabling that the strain of blade is reduced.

Furthermore by making the blade point downwards during the de-icing process it is ensured that the shaken-off ice is gathered in a pile in front of the tower base. This is advantageous in that it thereby is prevented that the shaken-off ice is distributed over a large area surrounding the wind turbine and thereby possibly damaging neighbouring buildings, crops or other things.

In an aspect of the invention the method further comprises the step of positioning the blade in a first substantially sideways pointing direction before the controlled acceleration condition is created.

It is advantageous to make the blade point sideward during the de-icing process in that the gravity pull in the blade would induce flexing of the blade, which in itself could break some of the ice loose and thereby further aid the de-icing process.

In an aspect of the invention the blade further is positioned so that it points in a substantially opposite direction of the first sideways pointing direction and wherein a further controlled acceleration condition and a further controlled deceleration condition are created while the blade is positioned in the opposite sideways pointing direction.

When the blade is positioned in the first substantially sideways pointing direction it will deflect in one direction and when positioned in the opposite sideways pointing direction the blade will deflect in the opposite direction. This is advantageous in that the deflection of the blade in a different direction will further aid loosening the ice during the de-icing procedure.

In an aspect of the invention the controlled acceleration condition and the controlled deceleration condition are created repeatedly.

By creating the controlled acceleration condition repeatedly the de-icing procedure becomes more efficient.

In an aspect of the invention the controlled acceleration condition and the controlled deceleration condition are created repeatedly at a frequency substantially similar to a natural frequency of the blade or in phase with the natural frequency.

By creating the controlled acceleration condition and the controlled deceleration condition the right way at the right time it is ensured that even relatively small impacts on the blade (small pitch turns, small yaw turns, small rotor turns, etc.) could lead to increased energy build-up in the blade and thereby increased oscillation or increased deflection of the blade, making the de-icing process more efficient.

In an aspect of the invention the method further comprises the step of detecting an icy condition on the blade before the controlled acceleration condition and the controlled deceleration condition are created.

Creating a controlled acceleration and deceleration condition in the blade could strain the blade and it would take time and energy during the start-up procedure and it is therefore advantageous to only de-ice the blade if an unwanted ice condition were detected.

In an aspect of the invention controlled acceleration condition and the controlled deceleration condition of the blade are created by actuating one or more actuating means of the wind turbine.

By creating the controlled acceleration and deceleration condition by actuating means already present in the wind turbine—such as the pitch mechanism of the blades, the yaw mechanism, the rotor actuating means or other—it is ensured that external or dedicated actuating means is avoided thereby reducing the cost of the de-icing system.

In an aspect of the invention the controlled acceleration condition and the controlled deceleration condition of the blade are created by actuating a pitch mechanism of the blade.

It is particularly advantageous to make the pitch mechanism of a specific blade create the controlled acceleration and deceleration condition of the specific blade in that this will not substantially increase the strain on other parts of the wind turbine during the de-icing procedure.

Furthermore the pitch mechanism is relatively fast acting making it suited for creating a controlled acceleration and deceleration condition of the blade and even further by using the pitch mechanism it is possible to de-ice the blades one at a time and thereby, for example, ensure that the blade is positioned in a specific azimuth position during the de-icing procedure.

In an aspect of the invention the controlled acceleration condition and the controlled deceleration condition of blade are created by actuating a yaw mechanism and/or rotor actuating means of the wind turbine.

Using the yaw mechanism and/or rotor actuating means to shake the ice or snow off the blades is advantageous in that this will de-ice all the blades at the same time and in that this method can be used on wind turbines which do not comprise means for pitching the blades such as stall controlled wind turbines.

Furthermore, the invention provides for a wind turbine comprising a rotor including at least one blade, and de-icing means for deicing the blade wherein the de-icing means comprises actuating means of the wind turbine and wherein the de-icing means further includes control means for performing the de-icing method.

Hereby is achieved an advantageous embodiment of the invention.

In an aspect of the invention the wind turbine further comprises detection means for detecting an icy condition on said blade.

In an aspect of the invention said wind turbine further comprises azimuth angle detection means for detection of the actual azimuth position of the blade.

Making the wind turbine comprise azimuth angle detection means is advantageous in that it thereby is possible to ensure that the blade is positioned in a specific azimuth position before the blade is de-iced.

In an aspect of the invention the wind turbine further comprises rotor actuating means for positioning the blade in a predefined azimuth position during de-icing of the blade.

In an aspect of the invention the wind turbine blade comprises hydrophobic surface material.

Making the blade comprise hydrophobic surface material is advantageous in that this will prevent ice build-up on the blade and/or aid in loosening the ice during the de-icing procedure.

Even further the invention provides for use of a wind turbine having a de-icer for de-icing a blade of the wind turbine, wherein the wind turbine is a Megawatt wind turbine.

The larger the wind turbine is, the more difficult it is to de-ice and the more costly down time is because of the ceased power production and it is therefore particularly advantageous to use a de-icing procedure according to the invention for de-icing a wind turbine with a nominal power output of above one Megawatt.

BRIEF DESCRIPTION OF THE DRAWINGS

The invention will be described in the following with reference to the figures in which.

DETAILED DESCRIPTION OF THE INVENTION

Figure 1:
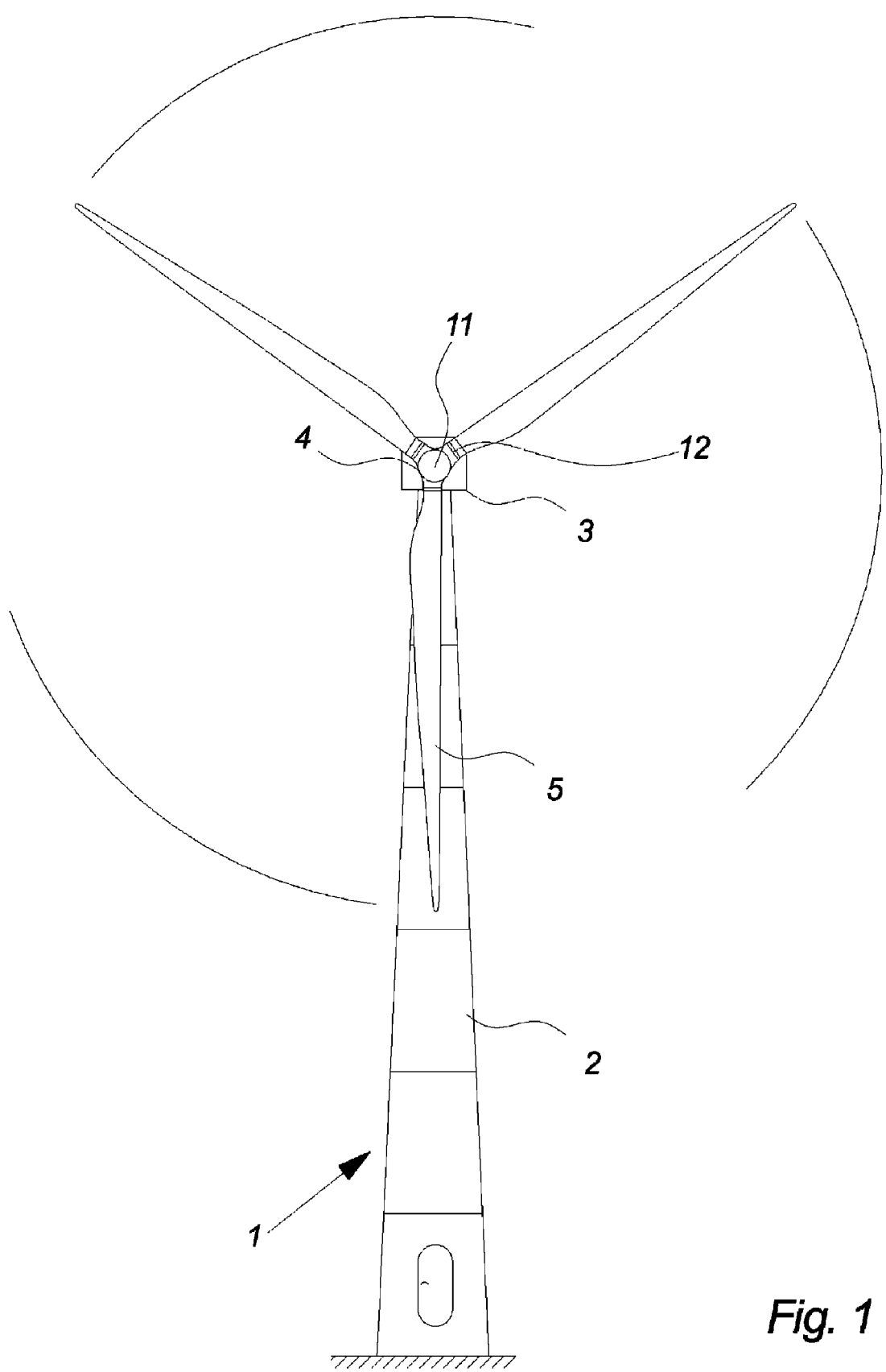
FIG. 1 illustrates a large modern wind turbine known in the art, as seen from the front.

FIG. 1 illustrates a modern wind turbine 1, comprising a tower 2 placed on a foundation and a wind turbine nacelle 3 positioned on top of the tower 2. The wind turbine rotor 4 comprises three wind turbine blades 5 extending from and connected to a common hub 11 and the hub 11 is connected to the nacelle 3 through the low speed shaft which extends out of the nacelle 3 front.

The illustrated wind turbine 1 is a pitch controlled wind turbine 1 in that each blade comprises a pitch arrangement 12 for pitching the blades 5 in relation to power output, wind speed, rotational speed or other during normal operation of the wind turbine 1.

However according to the present invention the wind turbine 1 could instead be a stall controlled wind turbine 1, an active stall controlled wind turbine 1 or another type of wind turbine.

On a stall controlled wind turbine 1 the blades 5 are not able to pitch i.e. they are rigidly fixed to the hub 11. The blades 5 are therefore designed to go deeper into stall the higher the wind speed is and thereby (passively) control the load on the wind turbine.

An active stall controlled wind turbine 1 technically resembles a pitch controlled wind turbine 1, in that they both comprise a pitch arrangement 12 for pitching the blades 5, and in order to get a reasonably large torque (turning force) at low wind speeds, the active stall controlled wind turbine 1 will usually be programmed to pitch the blades 5 much like a pitch controlled wind turbine 1 at low wind speeds. When the active stall controlled wind turbine 1 reaches its rated power, it will pitch its blades 5 in the opposite direction from what a pitch controlled wind turbine 1 does, if the generator 1 is about to be overloaded. In other words, it will increase the angle of attack of the rotor blades 5 in order to make the blades 5 go into a deeper stall, thus wasting the excess energy in the wind.

All of the above mentioned wind turbine types also comprise a yaw mechanism 13 for maintaining the rotor plane substantially perpendicular to the direction of the wind at all times.

A large modern wind turbine 1 can further comprise rotor actuating means 14 for rotating the rotor 4 e.g. to position the blades 5 in specific positions during maintenance or to position the rotor 4 in a specific stop position. The rotor actuating means 14 could e.g. be the wind turbine generator 8 acting as a motor or it could be dedicated motor e.g, driving the high speed shaft in the nacelle 3 thereby using the wind turbine gearbox 6 to gear the rotation.

Figure 2:
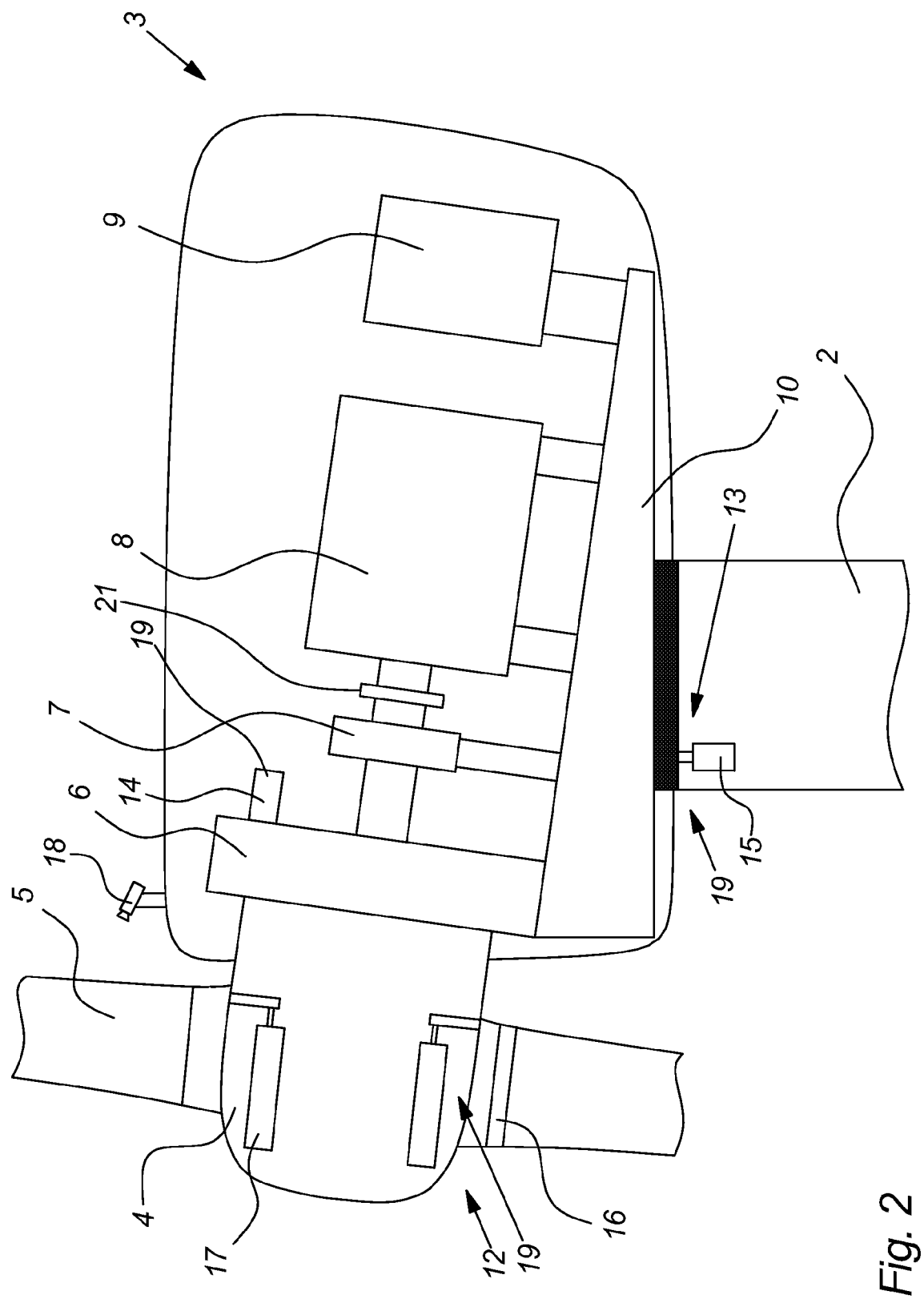
FIG. 2 illustrates a simplified cross section of a nacelle, as seen from the side.

FIG. 2 illustrates a simplified cross section of a nacelle 3, as seen from the side.

Nacelles 3 exists in a multitude of variations and configurations but in most cases the drive train in the nacelle 3 almost always comprise one or more of the following components: a gearbox 6, a coupling (not shown), some sort of breaking system 7 and a generator 8. A nacelle 3 of a modern wind turbine 1 can also include a converter 9, an inverter (not shown) and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in the form of a bed frame to which some or all the components 6, 7, 8, 9 are connected. In another embodiment the load carrying structure 10 could comprise a gear bell transferring the load of the rotor 4 to the tower 2 and/or the load carrying structure 10 could comprise several interconnected parts such as latticework.

In this embodiment of the invention the drive train is established in a operation angle of 8° in relation to a plane perpendicular to a centre axis through the tower 2 (i.e. a horizontal plane). The drive train is for among other reasons angled to enable that the rotor 4 can be angled correspondingly e.g. to ensure that the blades 5 do not hit the tower 2, to compensate for the differences in wind speed at the top and bottom of the rotor 4 and other things.

At the bottom of the nacelle 3 the wind turbine 1 is provided with a yaw mechanism 13 fitted in the joint between the tower 2 and the nacelle 3. The yaw mechanism 13 typically comprises some kind of toothed slewing bearing actuated by some kind of motor driven pinion 15.

As previously explained the blades 5 of a pitch controlled wind turbine 1 or an active stall regulated wind turbine 1 are provided with a pitch mechanism 12. In the illustrated embodiment the blades 5 are connected to the hub 11 through pitch bearings 16, enabling that the blades 5 can rotate around their longitudinal axis.

In this embodiment the pitch mechanism 13 comprises means for rotating the blades in the form of linear actuators 17 connected to the hub 11 and the respective blades 5. In a preferred embodiment the linear actuators 17 are hydraulic cylinders. In another embodiment the pitch mechanism 13 could comprise stepper motors or other means for rotating the blades 5.

In this embodiment of the invention the nacelle 3 is further provided with detection means 18 for detecting if ice, snow or other unwanted foreign objects are present on the blades 5. In another embodiment the detection means 18 could be placed inside the nacelle 3 inside the hub 11, in or on the blades 5 or elsewhere on or at the wind turbine 1.

In this embodiment the detection means 18 comprise a vision system for direct detection of icy conditions on the blades 5 but in another embodiment the ice condition of the blade 5 could also be directly measurement by fiber optic sensors in the blades or other means or the icy conditions could be detected by means of indirect measurement such as measurements of the strain in the blades 5, measurements of the deflection of the blades 5, measurements of rotor 4 imbalance or other things.

In this embodiment of the invention the wind turbine 1 further comprises azimuth angle detection means 21 in the form of an encoder placed on the high speed shaft of the drive train. The azimuth angle detection means 21 detects the actual azimuth position of the different blades 5 which is useful when positioning the blades 5 in specific azimuth positions e.g. during the de-icing process.

In another embodiment the azimuth angle detection means 21 could comprise other types of position detection means such as sensors being activated when the blade 5 is in a specific azimuth position or within a specific azimuth range.

Figure 3:
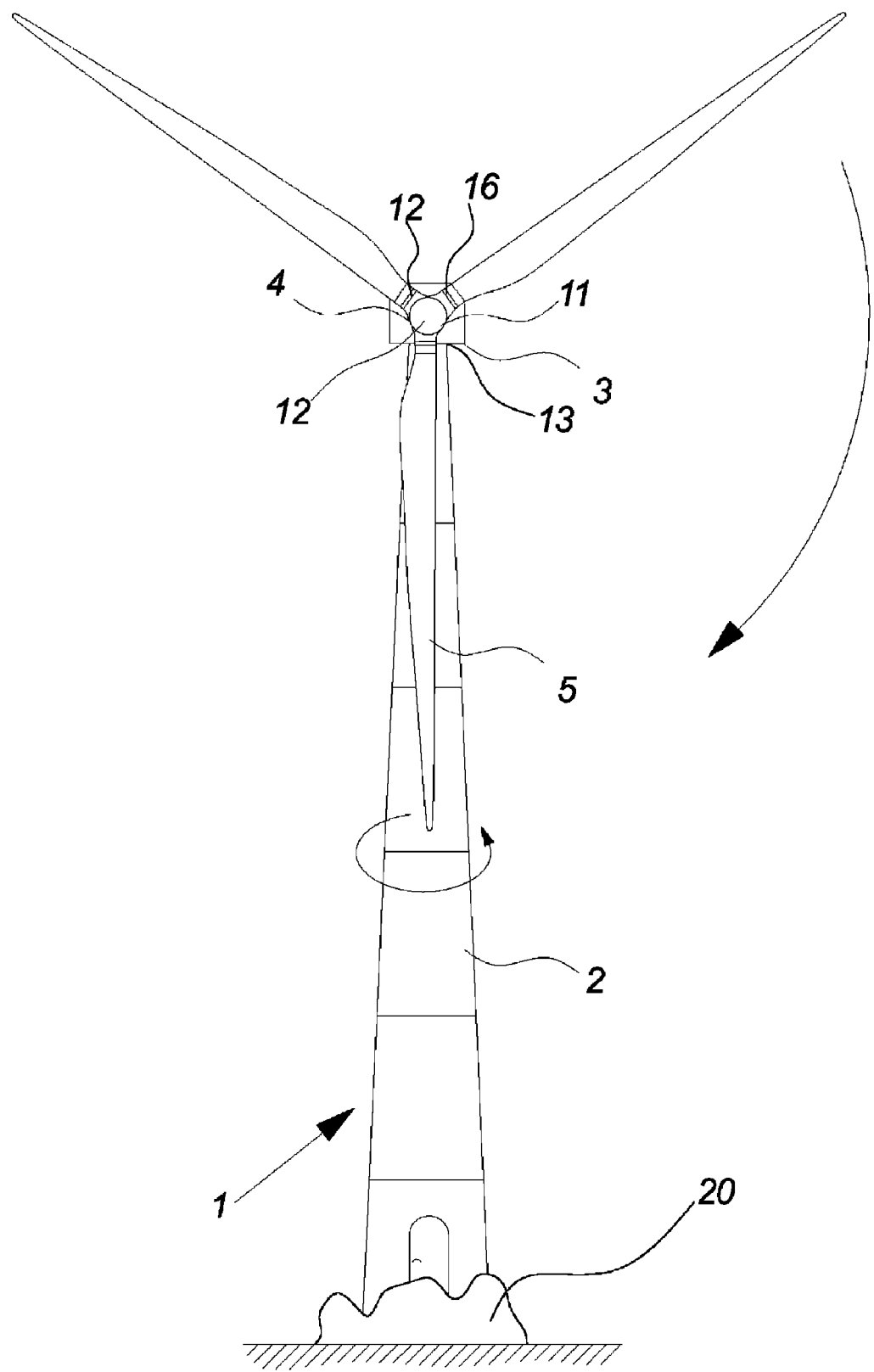
FIG. 3 illustrates a wind turbine de-icing a downward pointing blade, as seen from the front.

FIG. 3 illustrates a wind turbine 1 in the process of de-icing a downward pointing blade 5, as seen from the front.

In this embodiment of the invention the wind conditions has changed for the better and the idle wind turbine 1 is therefore starting up to resume power production.

In this embodiment the wind turbine 1 was put to a standstill due to too low wind but the wind turbine 1 could also be stopped due to too high wind, due to maintenance or other things.

Before the wind turbine 1 is restarted, the rotor actuating means 14 are activated and the blades 5 are one by one brought to an azimuth position of approximately 180° i.e. the blade 5 is substantially pointing directly downwards. When a specific blade 5 reaches this position rotor actuating means 14 stops the rotation of the rotor 4 and actuating means of the wind turbine 1 creates a controlled acceleration condition and subsequently a controlled deceleration condition of the blade by activating the pitch arrangement 12.

In this embodiment the pitch arrangement 12 pitches the blade 5 back and forth as hard as possible by the pitch arrangement 12 or as hard as the blade 5 or the pitch arrangement 12 can take. The snow or ice of the downwards pointing blade 5 is thereby "shaken" off the blade 5 creating a pile 20 of fallen down snow or ice at the root of the wind turbine tower 2.

In another embodiment the blade 5 could be stepped forward in one direction and then stepped backward substantially to the starting point.

In a further embodiment the blade 5 could be pitched back and forth or the blade 5 could be pitched in steps at a frequency at or close to a natural frequency of the blade 5 or at least in phase with a natural frequency of the blade 5 so that the oscillations of the blade 5 builds up and increases the acceleration and deceleration condition so that the chance of the ice being hurled off is increased.

After the downward pointing blade 5 has been de-iced the rotor will turn so that the next blade 5 is positioned in a downward pointing position, hereafter this blade 5 is de-iced and this procedure will then continue until all the blades 5 have been de-iced, at least until all the blade 5 on which ice has been detected have been de-iced or until all the blades 5 which would be at risk of comprising icy conditions have been de-iced e.g. the two blades 5 pointing upwards when a three bladed wind turbine 1 is parked with the blades 5 in a Y-position.

In this embodiment of the invention the blade surface comprises a gel-coat which shows good hydrophobic qualities but in another embodiment the blade surface could comprise another hydrophobic coating thereby enabling that the ice and snow is shaken off the blade 5 more easily.

The hydrophobic and/or icephobic outer layer on the blade 5 could, for example, be provided to the blade 5 through air-spraying by a method similar to the one used in car paint spraying. The method comprises smoothening the blade surface and then applying the gel-coat through spray painting in several thin layers.

The painted blade 5 is then left to dry for a few hours, and a smooth hydrophobic and/or icephobic finish is achieved. The paint layers could, for example, be supplemented by a primer layer for even better surface smoothness.

The hydrophobic and/or icephobic quality of the blade surface aids in preventing ice build-up on the blade surface and it aids in ensuring that ice on the blade surface are loosened more easily.

Figure 4:
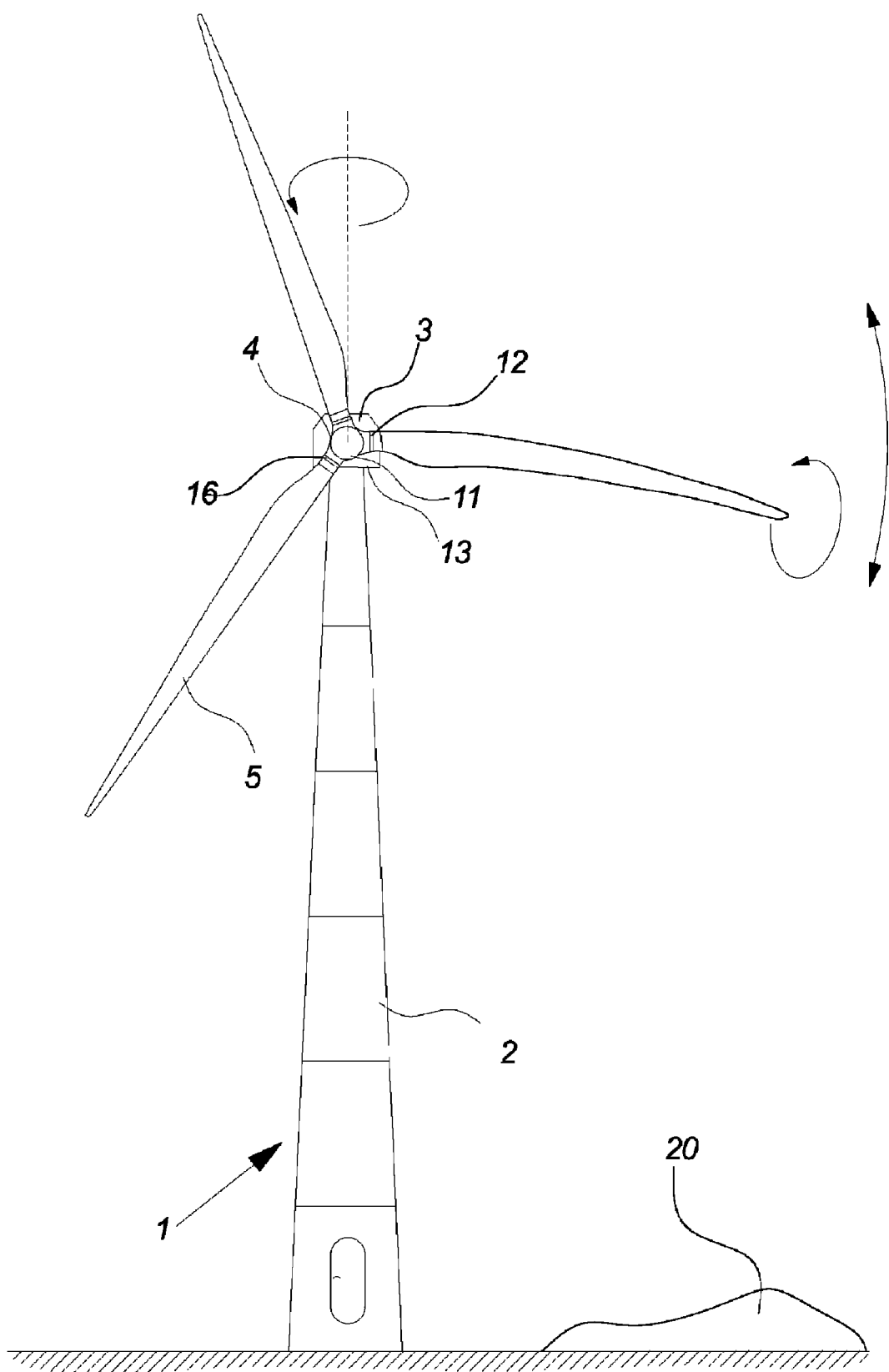
FIG. 4 illustrates a wind turbine de-icing a blade pointing to the right, as seen from the front, and FIG. 5. illustrates a wind turbine de-icing a blade pointing to the left, as seen from the front.

FIG. 4 illustrates a wind turbine 1 in the process of de-icing a blade 5 pointing to the right, as seen from the front.

In this embodiment the flexibility of the large modern wind turbine blades 5 is utilized to increase the de-icing effect. Instead of pointing the blade 5 downwards while establishing the controlled deceleration condition, the blade 5 is brought to an azimuth position where it is pointing sideways before the controlled deceleration condition is created. The controlled deceleration condition will make the blade 5 flap and thereby induce ice loosening bends in the blade 5 which will make it easier for the controlled deceleration condition to shake the ice or snow off the blade 5.

In this embodiment the controlled acceleration and deceleration condition of the blade 5 are created by pitching the blade 5 back and forth to shake the ice or snow off the blade 5 so that it form a pile 20 on the ground next to the wind turbine 1.

However in another embodiment of the invention the actuating means 19 could be the yaw mechanism 13 rocking the nacelle 3 and thereby the rotor 4 and blades 5 from side to side to create a controlled acceleration and deceleration condition of the blade 5, which is big enough to shake off the main part of the ice off of the blades hereby enabling that power production can be resumed without risking damage to the wind turbine, substantially without reducing the wind turbines efficiency and without risking that ice is hurled of the blades 5 at high speed hereby risking damage to neighbouring houses, livestock, persons or other things.

Since it is a very large mass that has to be brought into motion if the yaw mechanism 13 is used as actuating means 19 it is doubtful if it is possible to swing the nacelle 3 from side to side at a frequency close to a natural frequency of the blades 5 and it would therefore be advantageous to yaw at a frequency which is in phase with the natural frequency of the blades 5.

In another embodiment of the invention it could also be the rotor actuating means 14 which would act as actuating means 19 for creating the controlled acceleration and deceleration condition of the blade 5. The rotor 4 would then turn back and forth to create the controlled acceleration and deceleration condition which would shake the ice off the blades 5.

No matter if the controlled acceleration and deceleration condition are created by a pitch arrangement 12 of the blade 5, by a yaw mechanism 13 of the wind turbine 1, or the rotor actuating means 14 or by any combination thereof the execution will be controlled by control means of the de-icing means e.g, in the form of special software and hardware for controlling the actuating means 19 during the de-icing procedure or by means of software integrated in the existing wind turbine software—for controlling the operation of the wind turbine 1—in combination with the existing hardware for controlling the operation of the wind turbine 1 such as PLCs, PCs or other things.

Figure 5:
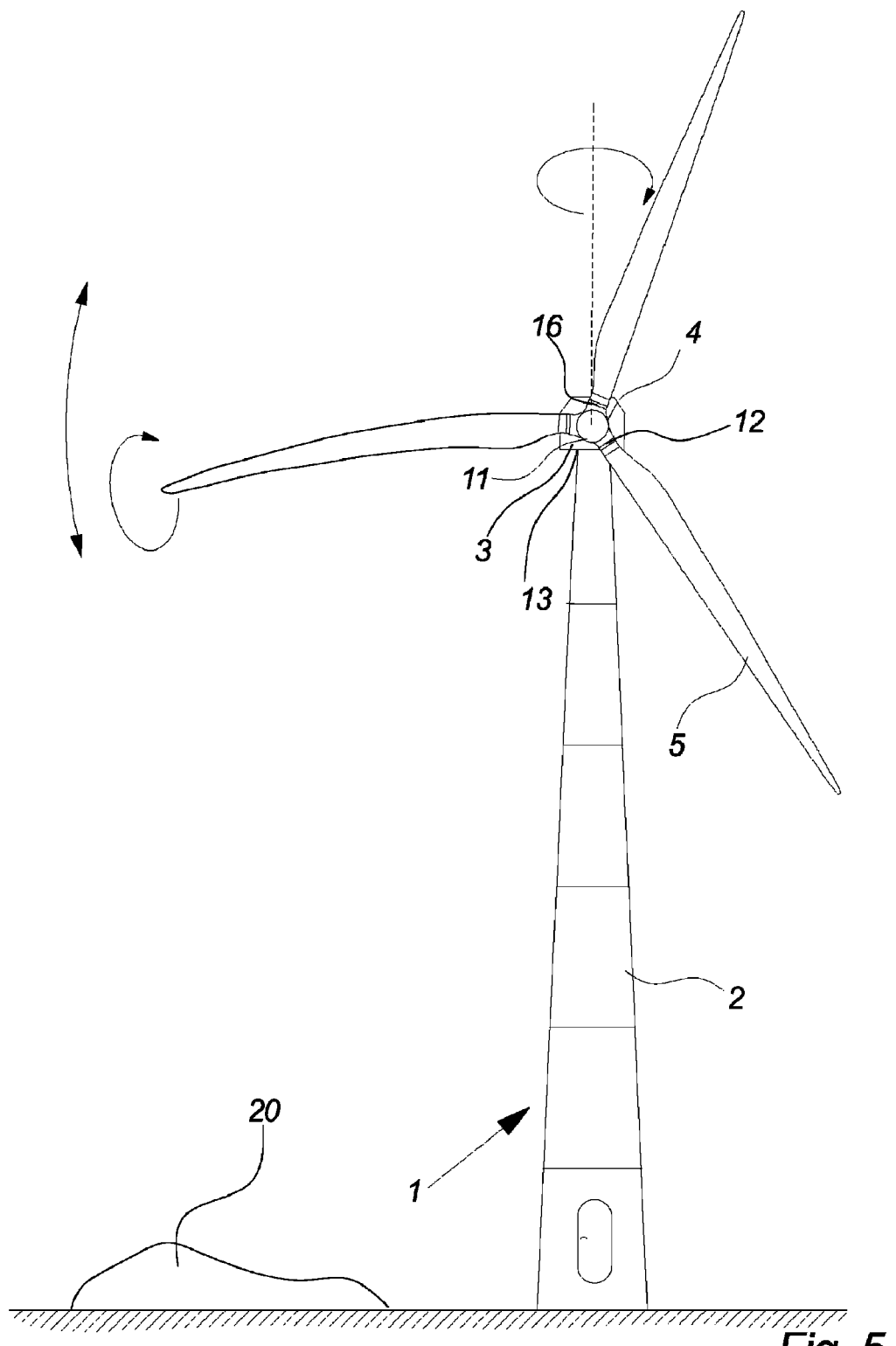

FIG. 5 illustrates a wind turbine 1 in the process of de-icing a blade 5 pointing to the left, as seen from the front.

In this embodiment of the invention the rotor 4 has now been turned 180° by the rotor actuating means 14 so that the blade 5 that was pointing to the right in FIG. 4 is now pointing to the left.

If, for example, it has been detected that the de-icing procedure performed when the blade 5 was pointing to the right, did not remove the ice to a satisfactory level or as a standard procedure, the rotor 4 is now turned 180° so that the blade 5 deflects differently whereby the chances of shaking off the ice is increased.

The previously described de-icing procedures could only be performed if icy conditions on the blades 5 where detected by the detection means 18 or the procedures could be performed as a standard procedure every time the wind turbine 1 resumes power production after a period of being idle.

The de-icing procedure could also only be carried out if certain meteorological conditions where present such as if the temperature is below a certain level, if a combination of information on ambient temperature and humidity were present, if certain meteorological conditions were present at the same time as imbalance of the rotor 4 was detected or other things.

The invention has been exemplified above with reference to specific examples of wind turbines 1, detection means 18, actuating means 19, de-icing procedures and other things. However, it should be understood that the invention is not limited to the particular examples described above but may be designed and altered in a multitude of varieties within the scope of the invention as specified in the claims.

What is claimed is:

1. A method for de-icing a blade of a wind turbine, after the wind turbine has been idle for a period of time, comprising:
   establishing a predefined azimuth angle in a controller;
   positioning the blade in the predefined azimuth angle; and
   shaking ice off the blade, comprising:

creating a controlled acceleration condition of the blade and subsequently creating a controlled deceleration condition of the blade by oscillatingly actuating at least one of a pitch mechanism of the blade to oscillate the pitch of the blade about an initial blade pitch rest position, a yaw mechanism of the wind turbine to oscillate the yaw of the wind turbine about an initial wind turbine yaw rest position, and a rotor of the wind turbine to oscillate the rotor about an initial rotor rest position.

2. The method according to claim 1 further comprising positioning the blade in the predefined azimuth angle before the controlled acceleration condition is created.

3. The method according to claim 1, wherein positioning the blade in the predefined azimuth angle includes positioning the blade in a substantially downwards pointing direction before the controlled acceleration condition is created.

4. The method according to claim 1, wherein positioning the blade in the predefined azimuth angle includes positioning the blade in a first substantially sideways pointing direction before the controlled acceleration condition is created.

5. The method according to claim 4, further comprising:
positioning the blade so that it points in a substantially opposite direction of the first sideways pointing direction; and
creating a further controlled acceleration condition and a further controlled deceleration condition while the blade is positioned in the opposite sideways pointing direction.

6. The method according to claim 1, wherein the controlled acceleration condition and the controlled deceleration condition are created repeatedly.

7. The method according to claim 6, wherein the controlled acceleration condition and the controlled deceleration condition are created repeatedly at a frequency substantially similar to a natural frequency of the blade or in phase with the natural frequency.

8. The method according to claim 1, further comprising detecting an icy condition on the blade before creating the controlled acceleration condition and the controlled deceleration condition.

9. The method according to claim 1, wherein creating the controlled acceleration condition and the controlled deceleration condition of the blade includes actuating one or more actuators of the wind turbine.

10. A wind turbine, comprising:
a tower;
a nacelle rotatably coupled to a top of said tower for yaw motion;
a rotor rotatably coupled to said nacelle for rotational motion,
at least one blade rotatably coupled to said rotor for pitch motion, and
a de-icer for de-icing said blade, wherein said de-icer comprises:
a pitch mechanism for imparting pitch motion to said blade,
a yaw mechanism for imparting yaw motion to said nacelle,
a rotational mechanism for imparting rotational motion to said rotor,
an actuator for actuating at least one of said pitch mechanism, yaw mechanism, and rotational mechanism, and
a controller operatively coupled to said actuator and configured to position said blade in a predefined azimuth angle and shake ice off said blade by creating a controlled acceleration condition of the blade and subsequently creating a controlled deceleration condition of the blade, the controlled acceleration condition and the controlled deceleration condition of the blade being created by the actuator by oscillatingly actuating at least one of said pitch mechanism to oscillate the pitch of said blade about an initial blade pitch rest position, said yaw mechanism to oscillate the yaw of said nacelle about an initial nacelle yaw rest position, and said rotational mechanism to oscillate the rotation of said rotor about an initial rotor rotational rest position.

11. The wind turbine according to claim 10, further comprising a detector for detecting an icy condition on said blade.

12. The wind turbine according to claim 10, further comprising an azimuth angle detector for detecting an actual azimuth position of said blade.

13. The wind turbine according to claim 10, further comprising a rotor actuator for positioning said blade in the predefined azimuth position during the de-icing of said blade.

14. The wind turbine according to claim 10, wherein said wind turbine blade comprises hydrophobic surface material.

15. The wind turbine according to claim 10 wherein said wind turbine is a Megawatt wind turbine that cause ice to be shaken off the blade.

16. A method for de-icing a blade of a wind turbine, after the wind turbine has been idle for a period of time, comprising:
creating a controlled acceleration condition of the blade that causes inertial forces in a direction that does not lie within a rotor plane defined by the blade of the wind turbine; and
creating a controlled deceleration condition of the blade that causes inertial forces in a direction that does not lie within the rotor plane,
wherein the inertial forces cause ice to be shaken off the blade,
wherein the steps of creating a controlled acceleration condition of the blade and creating a controlled deceleration condition of the blade are accomplished by oscillatingly actuating at least one of a pitch mechanism of the blade to oscillate the pitch of the blade about an initial blade pitch rest position, and a yaw mechanism of the wind turbine to oscillate the yaw of the wind turbine about an initial wind turbine yaw rest position.

17. The method according to claim 16, wherein creating a controlled acceleration and deceleration condition of the blade further comprises actuating a pitch mechanism of the blade.

18. The method according to claim 16, wherein creating a controlled acceleration and deceleration condition of the blade further comprises actuating a yaw mechanism of the wind turbine.

19. The method according to claim 16, wherein creating a controlled acceleration and deceleration condition of the blade is achieved without rotation of the blade within the rotor plane.

20. The method according to claim 19, further comprising positioning the blade in a predefined azimuth position before creating the controlled acceleration condition in the blade.

* * * * *